United States Patent
Omura et al.

(10) Patent No.: US 8,388,882 B2
(45) Date of Patent: Mar. 5, 2013

(54) MOLD FOR FORMING GOLF BALL AND GOLF BALL MANUFACTURED USING THE SAME

(75) Inventors: Youichi Omura, Chichibu (JP); Hirotaka Shimosaka, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 684 days.

(21) Appl. No.: 12/564,357

(22) Filed: Sep. 22, 2009

(65) Prior Publication Data

US 2011/0070974 A1    Mar. 24, 2011

(51) Int. Cl.
  *B29C 70/70*    (2006.01)
  *B29C 45/14*    (2006.01)
(52) U.S. Cl. .................. 264/275; 249/115; 425/116
(58) Field of Classification Search .............. 425/116; 249/115; 264/275, 278
  See application file for complete search history.

(56) References Cited

U.S. PATENT DOCUMENTS

| | | | | |
|---|---|---|---|---|
| 3,931,381 A | * | 1/1976 | Lindberg | 264/45.5 |
| 6,632,078 B2 | * | 10/2003 | Ogg et al. | 425/116 |
| 2002/0041058 A1 | * | 4/2002 | Murphy | 264/523 |
| 2003/0069084 A1 | * | 4/2003 | Brum | 473/367 |

FOREIGN PATENT DOCUMENTS

| | | | |
|---|---|---|---|
| JP | 04153010 A | * | 5/1992 |
| JP | 05007982 A | * | 1/1993 |
| JP | 5-23403 A | | 2/1993 |
| JP | 5-220241 A | | 8/1993 |
| JP | 5-318491 A | | 12/1993 |
| JP | 9-47525 A | | 2/1997 |
| JP | 9-300361 A | | 11/1997 |
| JP | 2000-102630 A | | 4/2000 |
| JP | 2002187134 A | * | 7/2002 |
| JP | 2006-346441 A | | 12/2006 |

OTHER PUBLICATIONS

Dominick Rosato et al, Injection Molding Handbook, 2000, Kluwer Academic Publishers, 3rd edition, pp. 334-346.*

* cited by examiner

*Primary Examiner* — Robert B Davis
(74) *Attorney, Agent, or Firm* — Sughrue Mion, PLLC

(57) ABSTRACT

A mold for forming a golf ball makes it possible to form minute dimples, and to improve mold release properties of the mold and wettability of the mold by a material when a urethane material is used for a cover layer. A mold according to the present invention is a mold for forming a urethane cover as an outermost layer of a golf ball, and includes: at least two split molds that are separably joined with each other, and that includes a cavity formed therein by the joining, the cavity being for forming the urethane cover; protrusions that are formed on a cavity surface of the split molds to form dimples of the golf ball; and a composite plating film that covers the cavity surface of the split molds, that comes into contact with a material of the urethane cover, and that contains a nickel-based matrix and fluororesin particles dispersed in the nickel-based matrix.

13 Claims, 1 Drawing Sheet

US 8,388,882 B2

MOLD FOR FORMING GOLF BALL AND GOLF BALL MANUFACTURED USING THE SAME

BACKGROUND OF THE INVENTION

The present invention relates to a mold for forming a urethane cover as an outermost layer of a golf ball, and also relates to a method of manufacturing a golf ball by using this mold and a golf ball manufactured by using this mold.

Heretofore, Japanese Patent Application Publication No. 05-318491 and Japanese Patent Application Publication No. 09-300361 have disclosed that forming a fluororesin film on a surface of a cavity in a mold used for forming a cover layer as an outermost layer of a golf ball can improve mold release properties of the molded golf ball.

However, a fluororesin film formed in a mold is thick due to the formation method therefore in which fluororesin is applied directly onto a cavity surface of the mold; hence, such a mold is not suitable as a mold for forming a golf ball having minute dimples. Moreover, the mold is provided with support pins to support the core of a golf ball in the cavity. However, galling occurs in the cavity surface of the mold and the side surfaces of the pins at the time of housing the pins in the mold or pushing out the pins toward the cavity. Due to such galling, the cover layer often fails to be released properly from the mold and the lives of the pins and the mold become shorter in some cases.

SUMMARY OF THE INVENTION

By taking account of these circumstances, a conceivable technique for maintaining appropriate slidability of the pins on the mold is to form a hard chromium plating film on the cavity surface and form a nickel plating film on the surface of each of the support pins. However, when a urethane material, which is a soft material, is used for the cover layer, the use of hard chromium plating cannot obtain sufficient mold release properties of the mold and wettability of the mold by the material. This causes a problem of possibly manufacturing a golf ball having a defect due to pin poking (a defect which occurs when the pins poke the ball surface at the time of releasing the golf ball from the mold and thereby deform dimples in the ball surface) or a failure in material filling.

An object of the present invention is to provide a mold for forming a golf ball, the mold making it possible to form minute dimples, and to improve mold release properties of the mold and wettability of the mold by a material when a urethane material is used for a cover layer.

Moreover, another object of the present invention is to provide a method of manufacturing a golf ball, the method making it possible to prevent occurrence of a defect due to pin poking and a failure in material filling.

Furthermore, still another object of the present invention is to provide a golf ball which does not have any defect due to pin poking or any failure in material filling.

To achieve the above objects, an aspect of the present invention provides a mold for forming a urethane cover as an outermost layer of a golf ball, the mold including: at least two split molds that are separably joined with each other, and that include a cavity formed therein by the joining, the cavity being for forming the urethane cover; protrusions that are formed on a cavity surface of the split molds to form dimples of the golf ball; and a composite plating film that covers the cavity surface of the split molds, that comes into contact with a material of the urethane cover, and that contains a nickel-based matrix and fluororesin particles dispersed in the nickel-based matrix.

A base material of the split molds can be made of pre-hardened steel. The mold can further include a support pin that supports a core of the golf ball in the cavity. A surface of the support pin can be also covered with the composite plating film. The urethane cover formed by using the mold can have a thickness of approximately 0.2 mm to approximately 0.3 mm. The ratio of a surface of the protrusions for forming dimples with respect to the cavity surface of the mold can be at least 70%.

Another aspect of the present invention provides a method of manufacturing a golf ball, including the step of forming a urethane cover as an outermost layer of a golf ball by using the mold.

Still another aspect of the present invention provides a golf ball including a urethane cover as an outermost layer of the golf ball, the urethane cover formed by using the mold.

DESCRIPTION OF THE PREFERRED EMBODIMENTS

An embodiment of the present invention will be described below with reference to the drawings. Described below, as a concrete example, is a case of manufacturing a two-piece solid golf ball by forming a urethane cover as an outermost layer of the golf ball around a core of the golf ball by using a predetermined mold through an injection molding method. Note that the present invention is not limited to this embodiment, and is also applicable to manufacturing of a different type of golf ball such as a three-piece solid golf ball.

Figure 1:
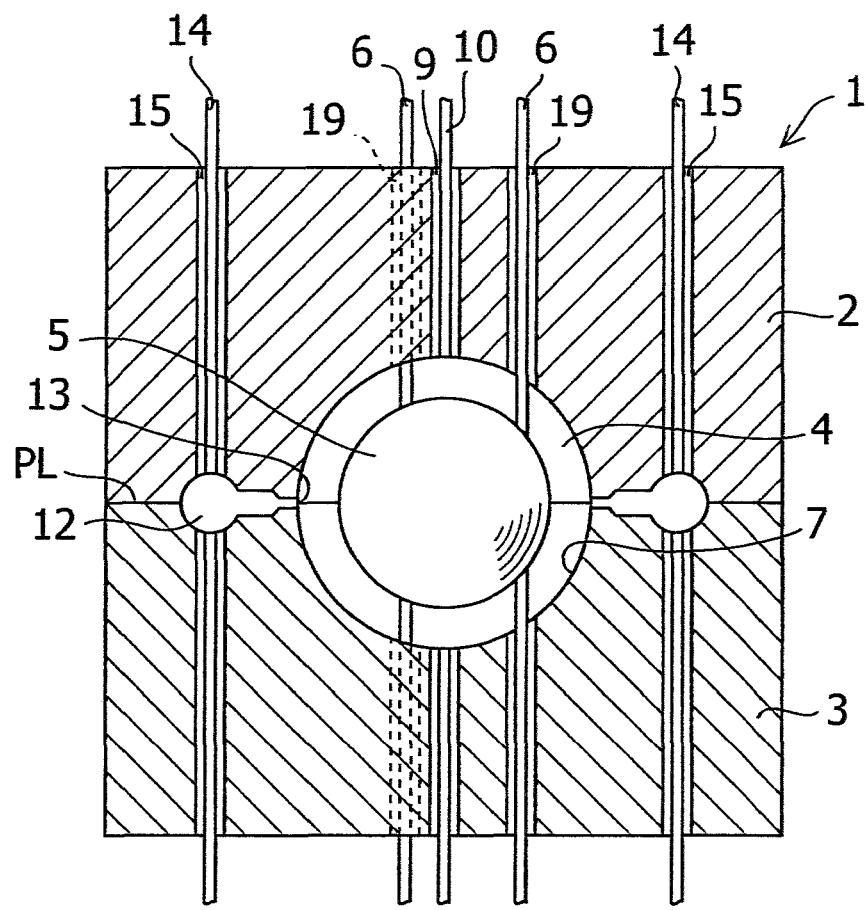
FIG. 1 is a cross-sectional view of a mold for forming a golf ball according to an embodiment of the present invention.

First, a mold for forming a urethane cover according to the present invention will be described. As shown in FIG. 1, a mold 1, which is an embodiment of the present invention, includes two split molds, an upper mold 2 and a lower mold 3. By separably joining the upper mold 2 and the lower mold 3, a spherical cavity 4 is formed inside the mold 1.

On a cavity wall surface 7 of the mold 1, a number of protrusions (omitted in FIG. 1) for forming dimples in a surface of the golf ball, that is, a surface of the urethane cover, are formed. A split surface PL of the upper mold 2 and the lower mold 3 is at a position corresponding to the equator of the cavity. In the cavity wall surface 7, a gas vent pin receiving hole 9 for venting gas is formed at positions of the north pole and the south pole of the cavity 4 so as to extend in directions orthogonal to the split surface PL of the mold 1. In this gas vent pin receiving hole, a gas vent pin 10 is accommodated to be capable of moving in and out.

In addition, in the cavity wall surface 7, multiple support pin receiving holes 19 are formed to extend in parallel with the gas vent pin receiving hole 9. In each of the support pin receiving holes 19, a support pin 6 for supporting a core 5 of the golf ball is disposed to be capable of moving in and out. By moving the support pins 6 into the cavity 4, the core 5 formed by a separate process in advance can be held at a central part of the cavity 4. Here, the number and arrangement of the support pins are not particularly limited, and such a number and arrangement of the support pins that the core 5 can be stably supported may be employed.

In the mold 1, a ring-shaped runner 12 is provided to surround the equator of the cavity 4. Multiple molding material injection gates 13, each opened to the inside of the cavity 4, are provided at the inner circumferential part of the ring-shaped runner 12 at regular intervals in a circumferential direction. Moreover, multiple ejector pins 14, capable of moving upward and downward in the directions orthogonal to the split surface PL, and receiving holes 15 therefore are formed in the circumference of the runner 12.

Figure 2:
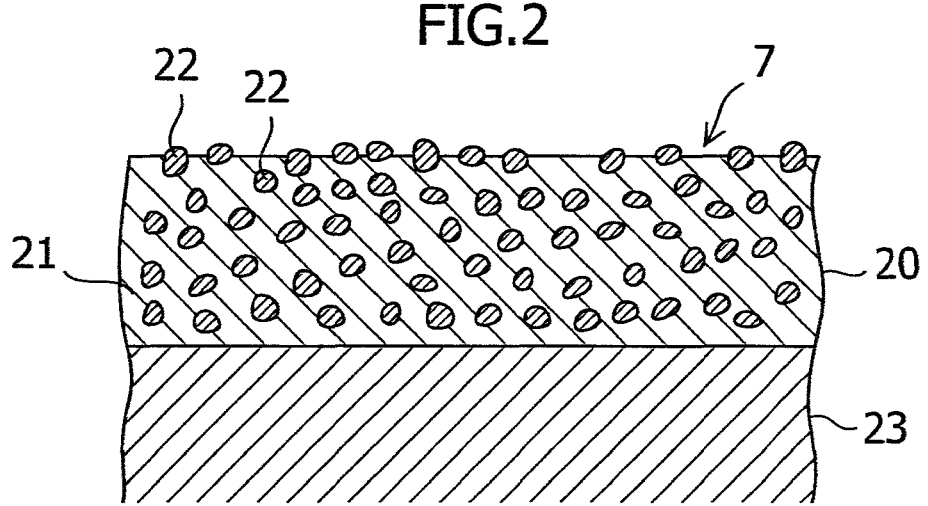
FIG. 2 is an enlarged cross-sectional view of a part of a cavity surface of the mold in FIG. 1.

As shown in FIG. 2, which is an enlarged cross-sectional view of the cavity wall surface 7, the cavity wall surface 7 of the mold 1 includes a composite plating film 20 formed to cover cavity surfaces of base materials 23 of the upper mold 2 and the lower mold 3. The composite plating film 20 is made of fluororesin particles 22 dispersed in a nickel-based matrix 21.

A material used for the split base materials 23 is not particularly limited as long as it is a platable metal, and can be used with molds made of a standard metallic material such as carbon steel, beryllium-copper alloy, stainless steel or copper, for example. Among these, heat-treated pre-hardened steel is used preferably. Pre-hardened steel has excellent processability and requires no heat treatment later, and is hence capable of forming complex dimple shapes precisely.

A material used for the nickel-based matrix 21 is not particularly limited as long as containing nickel as a main material, and an alloy of nickel with another metal and/or material, such as nickel-phosphorus alloy, nickel-copper-phosphorus alloy, nickel-boron alloy, cobalt-nickel alloy or nickel-molybdenum-phosphorus alloy, can be used, for example.

A material used for the fluororesin particles 22 dispersed in the nickel-based matrix 21 can be a polytetrafluoroethylene (PTFE) particles, tetrafluoroethylene-perfluoroalkyl vinyl ether copolymer (PFA) particles, tetrafluoroethylene-hexafluoropropylene copolymer (FEP) particles or tetrafluoroethylene-ethylene copolymer (ETFE) particles, for example. Among these, PTFE particles and FEP particles are particularly preferable. The particle size of the fluororesin particles 22 is not particularly limited, but is preferably approximately 0.05 μm or larger, and more preferably approximately 0.5 μm or larger. Moreover, the particle size of the fluororesin particles 22 is preferably approximately 3 μm or smaller, and more preferably approximately 2 μm or smaller.

The composite plating film 20 including the fluororesin particles 22 dispersed in the nickel-based matrix 21 is formed by a method of dispersing the fluororesin particles 22 in a plating solution of the nickel-based matrix 21 and then performing plating on the surfaces of the base materials 23 while stirring the plating solution. As such a plating method, an electroplating method or an electroless plating method can be employed, for example. However, an electroless plating method is preferably employed since an especially uniform film can be obtained by this method.

The thickness of the composite plating film 20 is not particularly limited, but is preferably set at approximately 20 μm or less, and more preferably approximately 10 μm or less. This is because the composite plating film 20 can be made very thin, and has sufficient durability as well as mold release properties and wettability by a urethane material even if made thin. Meanwhile, the lower limit of the thickness of the composite plating film 20 is preferably set at approximately 1 μm or greater, and more preferably approximately 2 μm or greater.

The mixing ratio of the fluororesin particles 22 in the composite plating film 20 is not particularly limited, but is preferably set at approximately 5 vol % or greater, and more preferably approximately 25 vol % or greater. Meanwhile, in order to obtain the composite plating film 20 having sufficient strength, the mixing ratio of the fluororesin particles 22 is preferably set at approximately 50 vol % or less, and more preferably approximately 40 vol % or less.

The composite plating film 20 is preferably subjected to heat treatment after being formed by the plating method, in order to improve adhesiveness of the composite plating film 20 to the base materials 23. The temperature of the heat treatment is preferably set at approximately 330° C. or greater, more preferably approximately 350° C. or greater, and even more preferably approximately 395° C. or greater, although this is not limited thereto since the temperature should be determined in consideration of the material kind, the particle diameter and the mixing ratio of the fluororesin particles 22. Moreover, the temperature of the heat treatment is preferably set at approximately 500° C. or less, more preferably approximately 450° C. or less, and even more preferably approximately 430° C. or less.

The hardness of the cavity wall surface 7 including the composite plating film 20 thus formed is preferably approximately 200 or greater, and more preferably approximately 280 or greater, in Vickers hardness (25 g), for improvement in the durability of the plating and prevention of separation of the plating. Meanwhile, the upper limit of the Vickers hardness of the cavity surface wall 7 is preferably approximately 400 or less, and more preferably approximately 320 or less.

The water contact angle of the cavity wall surface 7 including the composite plating film 20 thus formed is preferably set at approximately 95° or greater, and more preferably approximately 100° or greater. Meanwhile, the water contact angle is preferably set at approximately 120° or less, and more preferably set at approximately 115° or less. By setting the contact angle within such a range, the material of the urethane cover can be sufficiently filled up to the cavity wall surface 7.

Although omitted in FIGS. 1 and 2, the composite plating film 20 is also formed on the surfaces of the protrusions for forming dimples. The composite plating film 20 according to the present invention has excellent mold release properties and can be formed to have a small thickness. Accordingly, the composite plating film 20 is excellent in forming minute dimples. In general, when the surface occupation ratio of dimples (the sum of the areas which dimples occupy, with respect to the entire surface area of a virtual spherical surface of a golf ball assumed to have no dimples) is set high, the aerodynamic performance of the golf ball can be improved. Hence, it is preferable that the surface occupation ratio of dimples of a golf ball, that is, the surface occupation ratio of the protrusions on the cavity surface of the mold 1, be set high. The surface occupation ratio is preferably set at approximately 70% or greater, more preferably approximately 80% or greater, and even more preferably approximately 82% or greater. Meanwhile, the upper limit of the surface occupation ratio is preferably set at less than 100%.

Furthermore, since the composite plating film 20 according to the present invention has a small thickness and is excellent in forming dimples having a complex shape as described above, the protrusions for forming dimples are preferably protrusions for forming general circular dimples or protrusions for forming non-circular dimples. The non-circular dimple is a dimple having a boundary line with a land part in a streamline shape including a curved line portion and straight line portion. Such non-circular dimples can improve the aerodynamic performance of a golf ball.

The composite plating film 20 can be formed to cover the surfaces of the support pins 6, the vent pin 10 and the ejector pins 14, besides the above-described cavity surface. Conventionally, hard chromium plating has been formed to cover the cavity surface, and nickel plating has been formed to cover the surfaces of the support pins 6, the vent pin 10 and the ejector pins 14, to appropriately maintain their slidability. According to the present invention, the formation of the composite plating film 20 to cover the cavity surface and the surface of each of the pins improves their slidability, prevents galling of the pins and the mold, prevents a failure to properly release the urethane cover from the mold due to the gaffing, and also reduces the work steps required for plating in manufacturing or reforming the mold.

In addition, the composite plating film 20 can also be used to cover the surface of the ring-shaped runner 12. By thus forming the composite plating film 20 on the surface of the runner 12, the material of the urethane cover can efficiently be filled in the cavity 4.

A method of forming a urethane cover as an outermost layer of a golf ball by using the mold 1 having the above-described structure will be described. First, as shown in FIG. 1, the core 5 of a golf ball is placed between the upper mold 2 and the lower mold 3, and then the upper mold 2 and the lower mold 3 are joined, to form the cavity 4. Thereafter, the core 5 is supported at the central part of the cavity by the support pins 6. Subsequently, the material of the urethane cover is injected into the cavity 4 from the molding material injection gates 13. The material of the urethane cover flows into a space part between the core 5 and the cavity wall surface 7, and the flows of the material merge at the north pole and the south pole of the cavity 4. Thereby, the entire surface of the core 5 is covered with the material of the urethane cover.

Although the material of the urethane cover is not particularly limited as long as it includes as a base compound an injection-moldable urethane material, polyurethane thermoplastic elastomer, which is easy to reuse and suitable for injection molding, is especially preferable to be used as the material. Since the composite plating film 20 is formed as a part of the cavity wall surface 7 in the present invention, the wettability of the cavity surface wall 7 by the material of the urethane cover is improved, so that occurrence of a failure in material filling between the core 5 and the cavity wall surface 7 is prevented.

The composite plating film 20 according to the present invention has excellent mold release properties and wettability by the urethane material, and thus makes it possible to form a urethane cover having a low hardness, that is, a soft urethane cover. Preferably used for the urethane cover is a material that can form a urethane cover having a hardness of approximately 60 or less, and more preferably approximately 50 or less, in Shore D hardness. Meanwhile, the lower limit of the Shore D hardness of the urethane cover is preferably approximately 30, and more preferably approximately 35.

Moreover, since the composite plating film 20 according to the present invention has excellent mold release properties and wettability by the urethane material, a urethane cover having a thin layer thickness can be formed. The layer thickness of the urethane cover formed as the outermost layer of a golf ball is preferably approximately 3 mm or less, more preferably approximately 2 mm or less, and even more preferably approximately 1.5 mm or less. Meanwhile, the lower limit of the layer thickness of the urethane cover is preferably approximately 0.2 mm.

When the material of the urethane cover is injected into the cavity 4, air existing between the core 5 and the cavity wall surface 7 and gas such as volatile components released while mixed with the material are discharged to the outside of the mold 1 through a space between the gas vent pin 10 and the gas vent pin receiving hole 9. Moreover, the air and gas are also discharged to the outside of the mold 1 through spaces between the support pins 6 and the support pin receiving holes 19.

The support pins 6 moves so that the front ends of the support pins 6 would move back to the position of the cavity wall surface 7, when or immediately before the material of the urethane cover is filled in the cavity 4. Particularly by forming the composite plating film 20 on the surfaces of the support pins 6 as well, the support pins 6 are smoothly accommodated in the support pin receiving holes 19, and hence a failure in molding due to galling of the support pins 6 can be prevented. Here, to improve the surface occupation ratio of dimples, the front ends of the support pins 6 and the gas vent pin 10 are each preferably formed into a shape to be a protrusion for forming a dimple.

In this way, a golf ball including the core 5 covered with the material of the urethane cover and multiple dimples formed in the surface is manufactured. When the formation of the urethane cover is completed, the ejector pins 14 are operated to separate the upper mold 1 and the lower mold 2 to thereby take out the golf ball from the mold 1. Here, the cavity wall surface 7 is covered with the composite plating film 20, and hence has excellent mold release properties with the urethane cover. This facilitates releasing of the golf ball from the mold without causing any defect due to pin poking. Accordingly, air-blow pressure required for mold release can be reduced, and molding machinery can be reduced in size. To easily release the golf ball from the mold, the support pins 6 may be pushed out slightly toward the golf ball.

As to the composite plating film 20, the content of the fluororesin particles 22 may decrease, or the film thickness may become smaller, when the mold 1 is used many times. In such a case, the composite plating film 20 may be removed by washing the cavity wall surface 7 with sodium-hydroxide-based strong alkaline solution or nitric acid. By then forming the composite plating film 20 again on the cavity surface of the base materials 23, the mold 1 is reformed and can be reused.

An embodiment of the present invention has been described concretely. However, the present invention is not limited to the above-described embodiment, and changes and modifications apparent to those skilled in the art are all included in the technical scope of the present invention. For example, the same effects can be obtained by using, as the core 5 prepared in advance in the cavity 4, an intermediate layer forming member, which includes a core covered with an intermediate layer, instead of a rubber elastic body, which is a core of a golf ball. The intermediate layer may be made of a material of the same quality as the core, or a material of the same quality as the urethane cover.

EXAMPLE

An experiment for manufacturing a golf ball was carried out in the following way. Specifically, a golf ball was manufactured by: forming a urethane cover on a core by using a mold; and then releasing the resultant from the mold. The mold includes a composite plating film formed on a cavity surface and support pin surfaces, the composite plating film containing a nickel-based matrix and fluororesin particles dispersed in the nickel-based matrix. Here, nickel-phosphorus alloy was used as the nickel-based matrix, and PTFE particles each having a particle size of 0.1 μm to 0.3 μm were used as the fluororesin particles. The mixing rate of the fluororesin particles was set at 30 vol %. The composite plating film was formed to have a thickness of 5 μm±3 μm on the cavity surface.

As a material for forming a urethane cover, a soft material having a Shore D hardness of 40 was used. Moreover, the urethane cover was formed to have a layer thickness of 0.5 mm. The mold release was carried out at a temperature of 233° C., which allows the urethane cover to still be soft. This experiment process was carried out eight times, and whether a defect due to pin poking in mold release had occurred in the urethane cover surface was checked visually. The results are shown in Table 1. For comparison, the same experiment process was carried out by using a mold in which the cavity surface and support pin surfaces were covered with conventional plating films.

TABLE 1

|  | Treatment on Cavity Surface | Treatment on Support Pin Surface | Number of Instances of Pin Poking |
| --- | --- | --- | --- |
| Example | Composite plating film | Composite plating film | 0/8 |
| Comparative Example | Hard chromium electroplating film | Electroless nickel plating film | 6/8 |

As shown in Table 1, in an example using the mold in which the cavity surface and support pin surfaces were covered with the composite plating film, no golf ball was found to have a defect due to pin poking. This is because the mold has excellent mold release properties and wettability, and the slidability of the pins is also excellent, even when the soft urethane cover having a Shore D hardness of 40 is used. By contrast, in the comparative example using the mold in which the cavity surface was covered with a hard chromium electroplating film and the support pin surfaces were each covered with an electroless nickel plating film, a defect due to pin poking occurred in six out of eight golf balls.

What is claimed is:

1. A mold for forming a urethane cover as an outermost layer of a golf ball, comprising:
   at least two split molds that are separably joined with each other, and that include a cavity formed therein by the joining, the cavity being for forming the urethane cover;
   protrusions that are formed on a cavity surface of the split molds to form dimples of the golf ball; and
   a composite plating film that covers the cavity surface of the split molds, that comes into contact with a material of the urethane cover, and that contains a nickel-based matrix and fluororesin particles dispersed in the nickel-based matrix,
   wherein the cavity surface which is covered with the composite plating film has a Vickers hardness of approximately 200 to approximately 400.

2. The mold according to claim 1, wherein a base material of the split molds is made of pre-hardened steel.

3. The mold according to claim 1, further comprising a support pin that supports a core of the golf ball in the cavity, wherein a surface of the support pin is also covered with the composite plating film.

4. The mold according to claim 1, wherein the ratio of a surface of the protrusions for forming dimples with respect to the cavity surface of the mold is at least 70%.

5. A method of manufacturing a golf ball, comprising the step of forming a urethane cover as an outermost layer of a golf ball by using the mold according to claim 1.

6. The method according to claim 5, wherein the urethane cover has a thickness of approximately 0.2 mm to approximately 0.3 mm.

7. The method according to claim 5, wherein the urethane cover has a Shore D hardness of approximately 30 to approximately 50.

8. The mold according to claim 1, wherein the composite plating film is formed by being subjected to heat treatment having a temperature from approximately 330° C. to approximately 500° C.

9. The mold according to claim 1, wherein the cavity surface which is covered with the composite plating film has a water contact angle of approximately 95° to 120°.

10. The mold according to claim 1, further comprising a gas vent pin, wherein a surface of the gas vent pin is covered with the composite plating film.

11. The method according to claim 5, wherein the composite plating film is formed by being subjected to heat treatment having a temperature from approximately 330° C. to approximately 500° C.

12. The method according to claim 5, wherein the cavity surface which is covered with the composite plating film has a water contact angle of approximately 95° to 120°.

13. The method according to claim 5, wherein the mold further comprises a gas vent pin, a surface of the gas vent pin covered with the composite plating film.

* * * * *